INVENTOR.
CARL E. GRYCTKO

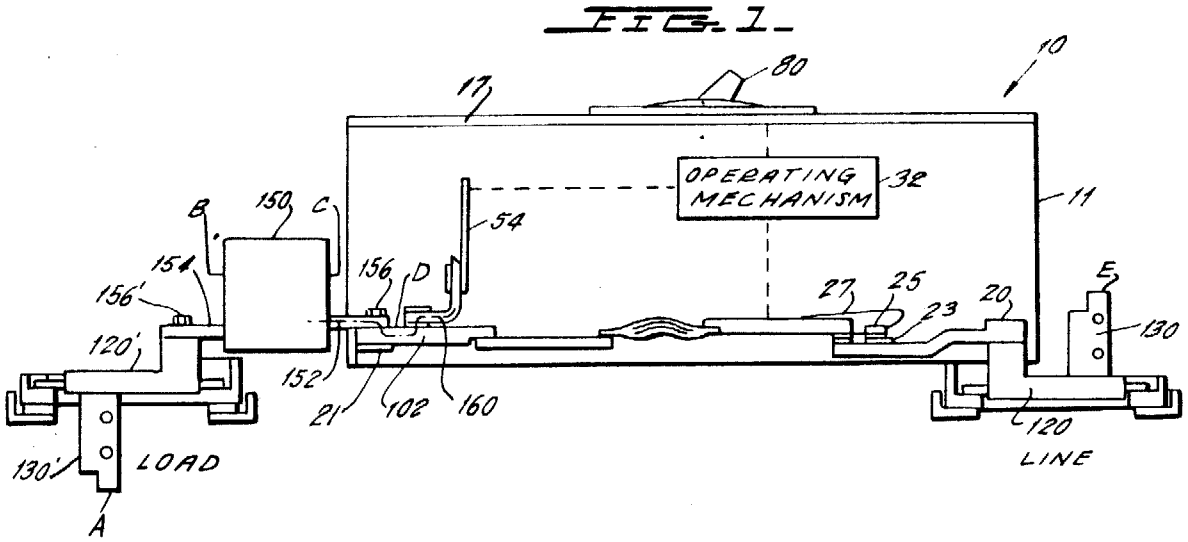
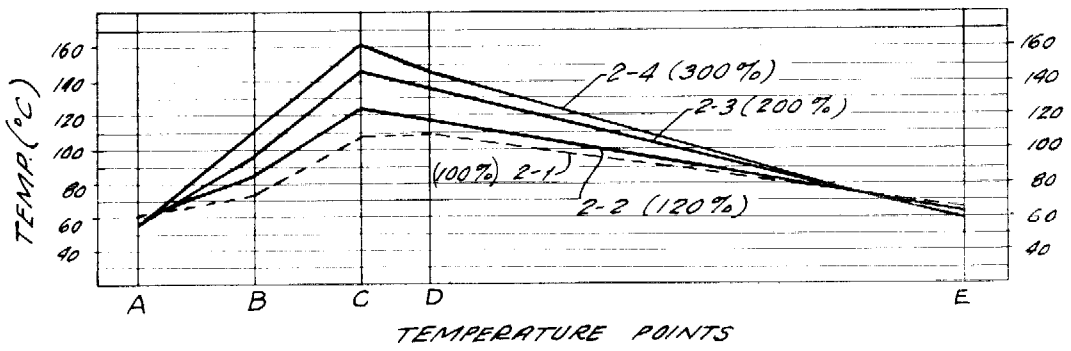
INVENTOR.
CARL E. GRYCTKO
BY
OSTROLENK, FABER, GERB & SOFFEN
ATTORNEYS

BY

OSTROLENK, FABER, GERB & SOFFEN
ATTORNEYS

INVENTOR.
CARL E. GRYCTKO

BY

OSTROLENK, FABER, GERB & SOFFEN
ATTORNEYS

INVENTOR.
CARL E. GRYCTKO

BY

OSTROLENK, FABER, GERB & SOFFEN
ATTORNEYS

United States Patent Office

Re. 26,465
Reissued Sept. 24, 1968

26,465

CIRCUIT BREAKER TRIP UNIT ASSEMBLY WITH IMPROVED THERMAL CHARACTERISTICS

Carl E. Gryctko, Haddon Heights, N.J., assignor to I-T-E Circuit Breaker Company, Philadelphia, Pa., a corporation of Pennsylvania Original No. 3,356,805, dated Dec. 5, 1967, Ser. No. 549,207, May 11, 1966. Application for reissue Jan. 23, 1968, Ser. No. 702,136
10 Claims. (Cl. 337—146)

Matter enclosed in heavy brackets [ ] appears in the original patent but forms no part of this reissue specification; matter printed in italics indicates the additions made by reissue.

ABSTRACT OF THE DISCLOSURE

A circuit breaker having a thermally responsive trip means in which the heat source is separately provided external to the main circuit breaker or trip unit housing. An illustrative embodiment utilizes a current limiting fuse means as the heat source for actuating the thermally responsive trip at overload current magnitudes within the interrupting capacity of the breaker.

My invention relates to a novel overload protection arrangement for circuit breaker devices, and more particularly to the manner in which a heater means is provided for the actuation of the circuit breaker's time delayed thermally responsive trip means. In a more specific aspect, the invention is directed to the electrically coordinated action of a current limiting fuse and circuit breaker device in which the fuse, in addition to its current limiting function, serves under conditions of a sustained moderate overload condition as a calibrated heat source for the circuit breaker thermal trip means.

Circuit breaker devices generally include at least one pair of cooperating contacts in the current path, an operating means for moving the contacts between their engaged and disengaged conditions and a current responsive trip unit assembly for initiating disengagement of the contacts upon the occurrence of predetermined abnormal load conditions. The current responsive trip unit assembly typically includes a thermally actuated, time-delayed tripping means, such as a bimetallic element, which is heated and deflected into actuation responsive to the sustained occurrence of an overload condition. In addition to such a thermally actuated time-delayed trip means, a faster acting, or instantaneous trip means is usually provided, such as a magnet and cooperating armature member which rapidly operates instantaneously responsive to the flux field generated by the occurrence of a fault condition of appreciably greater magnitude.

The actuation of the thermally actuated trip means is a function of both the overload magnitude and the time duration for which such overload condition persists. That is, the characteristics of the thermally actuated time-delayed trip means usually provides inverse time tripping within its range of operation so that a relatively small overload condition is permitted to flow for a relatively long period of time and a relatively large overload condition is only permitted to flow for a relatively short period of time.

The instant invention is concerned, in its broad aspects, with the manner in which a heat source means is provided for actuation of the time-delayed, thermally responsive trip means. In the past the heating and deflective movement of the bimetallic element has been provided by either directly connecting the bimetallic element in series with the current path through the circuit breaker unit, or providing a separate heater means within the trip unit portion of the circuit breaker device. Such separate heater means is in the series current path through the circuit breaker device and is positioned to indirectly heat the bimetallic element. The directly heated bimetal is usually employed in the lower rated sizes of molded case circuit breakers, of the type designed for household or light industrial use, while the current magnitudes of medium or larger frame size breakers generally require an indirectly heated bimetal. It is to the latter type of thermal trip unit that the instant invention is more specifically directed. While the inclusion of a separate heater means within the circuit breaker device may be practical for some of the medium or larger frame sizes of breakers, it has presented a considerable problem in the present trend towards the compact design of molded case circuit breakers to safely accommodate increasingly greater magnitudes of load current. More specifically, circuit breaker devices of the molded case variety are presently being utilized in systems having a continuous current rating of up to 1600 amperes at 600 volts and an available fault capacity of up to 100,000 amperes. During normal operation of the circuit breaker device, there will be a substantial amount of heat generated within the heater portion of the circuit breaker time-delayed thermal trip means, which heat must be safely dissipated in order to prevent inadvertent tripping of the breaker or excessive heating of its operating components. The requirement to safely dissipate this heat has been one of the principal limiting factors in reducing the size of such circuit breaker devices.

My invention solves this problem in an extremely practical manner, thereby permitting increased compactness of circuit breaker frame sizes, and ease of modifying the characteristics of the trip unit assembly. More specifically, I provide a separate heater means in a region providing free access to the surrounding atmosphere. In the illustrated embodiment, the heater means is external to the main casing of the circuit breaker device or trip unit assembly and I operatively inter-relate the thermal characteristics of such separate heater means and thermally responsive trip means, such that during the occurrence of a moderate overload condition (e.g. within the range intended to be interrupted by the actuation of the time delayed thermal trip means), heat will be generated in the separate heater means, in a manner operatively related to the magnitude of such overload condition. Such heat is then directed through a thermally conductive path to the thermally responsive (e.g., bimetallic) means. Advantageously, the thermal characteristics of the separate heater means and thermally responsive member are such that during normal load conditions there will be a minimum of heat flow from the heater means directed towards the thermally responsive means, and into its enclosed housing, with the heat generated by the heater being principally dissipated to the surrounding atmosphere.

In accordance with a particularly advantageous aspect of my invention, the separate heater means is in the form of a series connected current limiting device of the type which is designed to rapidly limit the current through the breaker from achieving a magnitude in excess of the interrupting capacity of the circuit breaker. More specifically, the combination of a series connected circuit breaker and current limiting device is well known in the art and is typically shown in U.S. Patent No. 2,843,702, issued July 15, 1958, in the name of William Harold Edmunds, entitled, "Protective Device with Current Limiting Means," and assigned to the assignee of the instant invention. In such arrangements, the coordination between the current limiting device and the circuit breaker trip unit enables the use of a circuit breaker device having a relatively low interrupting capacity as compared to the available short circuit capacity of the circuit being protected. For all magnitudes of overcurrent and fault current within the range capable of being interrupted by the circuit breaker, the trip characteristics are such that the time-delay thermal trip or the instantaneous magnetic trip of the circuit breaker unit will initiate operation of the circuit breaker mechanism, such that the cooperating contacts of all poles thereof are moved to the disengaged position. However, should a severe short circuit condition occur, the magnitude of which may exceed the interrupting capacity of the circuit breaker itself, the current limiting device will be rapidly actuated, serving to interrupt the fault current associated with the phase in which it occurs. Such actuation of the current limiting device is associated with a substantially lesser magnitude of let-through current therethrough, which is of a magnitude that may be safely handled by the circuit breaker unit, and serves to provide follow-up actuation of the circuit breaker trip means.

In such coordinated operation of the circuit breaker and current limiting devices, it has been the conventional practice to provide a heater means for the thermal trip means within the circuit breaker device and to independently calibrate the circuit breaker trip unit for the desired tripping characteristics. The series-connected current limiting devices have been designed and positioned with respect to the circuit breaker mechanism, such that the heat generated therein during normal, or moderate, overload conditions will not interfere with the desired tripping characteristic of the time-delayed thermal trip means. This has generally required a separate housing for the current limiting devices to serve as a thermal barrier to the circuit breaker trip unit assembly, or the design of the current limiting devices to minimize the temperature rise responsive to the occurrence of a moderate overload condition, within the desired tripping characteristics of the time-delayed thermal tripping means. I have, however, recognized that rather than treating the heat generated within the current limiting device as a problem to be avoided, it may advantageously be used as the principal, or at least a significant, source of heat for the desired operation of the thermally responsive trip means. More specifically, the current limiting device, which may typically be a current limiting fuse, is now selected such that it will experience a desired temperature rise and generate heat when subjected to an overload current with the range intended to be interrupted by the actuation of the thermally responsive means. Such generated heat is operatively related to the magnitude of the overload condition, and a thermally conductive path is provided between the current limiting device and the thermally responsive means of the trip unit. The thermal characteristics of the current limiting device and thermally responsive means are operatively inter-related in accordance with my invention, such that the current limiting device will be at a higher temperature than the thermally responsive means of the trip unit when subjected to such an overload condition, whereby the direction of temperature differential along the thermally conductive path is such as to establish heat flow from the current limiting device to the thermally responsive means. Hence, the current limiting device now serves the normal function of interrupting fault currents of a magnitude in excess of the circuit breaker rating, as well as the additional function of providing heat for actuation of the circuit breaker thermally responsive trip means.

Advantageously, the fuse is selected to give the required short circuit protection in coordination with a specified frame size breaker and have adequate thermal characteristics to supply sufficient heat for actuating the thermal element for all ampere ratings in the frame size. For each current rating a trip unit is utilized in which the conducting strap and bimetal characteristics are properly correlated with the heat generated within the fuse to obtain the desired tripping protection. That is, a single fuse may serve as the heat source for the different current ratings within the circuit breaker frame size, with a different bimetal and/or conducting strip being used for the various ratings. Alternatively, the externally located fuse may be changed to vary the moderate overload tripping characteristics in conjunction with a single trip unit assembly, with all of such fuse means having the desired short circuit characteristics, but differing thermal characteristics.

It is therefore seen that a primary object of my invention is to provide an improved heat source means for actuation of a circuit breaker thermal trip means.

Another object of my invention is to provide a circuit breaker device, including a first sub-assembly having a thermally responsive trip means and second sub-assembly including a heater therefor.

A further object of my invention is to provide a molded case circuit breaker device having a thermally responsive trip means which is actuated by a heater means external to the circuit breaker molded case housing and a thermally conductive path therebetween to provide heat flow from the heater means to the circuit breaker thermally responsive trip means under moderate overload conditions.

An additional object of my invention is to provide the combination of a circuit breaker device and current limiting fuse, in which the current limiting fuse serves as a heat source means for the circuit breaker thermally responsive trip means.

Still another object of my invention is to provide such a combination of a circuit breaker device and current limiting fuse, in which the current limiting fuse has an electrical characteristic such that it interrupts only abnormal currents in excess of the interrupting capacity of the circuit breaker device, and a thermal characteristic such that it increases in temperature and serves as a calibrated heat source when subjected to an overload current within the range of circuit breaker interrupting capacity intended to be actuated by the thermally responsive trip means thereof.

Still a further object of my invention is to provide a multi-phase molded case circuit breaker unit, having an integral trip means assembly including a thermally responsive means for each phase, and an individual heater means external of the trip means assembly for providing a calibrated heat flow input, to the thermally responsive means.

Still an additional object of my invention is to provide such a multi-phase molded case circuit breaker unit, in which the separate heater means is a current limiting device series connected to the circuit breaker and designed to both rapidly interrupt a severe short circuit condition in excess of the interrupting capacity of the circuit breaker device, and to generate heat operatively related to an overload condition up to a predeterminate magnitude within the interrupting capacity of the circuit breaker device.

These as well as other objects of my invention will become readily apparent upon a detailed consideration of the following descriptions and drawings in which:

FIGURE 1 is a schematic representation of a circuit breaker device, illustrating the generalized concept of my invention.

FIGURE 2 graphically shows the temperature and heat flow characteristics of the arrangement shown in FIG. 1, when subjected to normal and various overload conditions.

FIGURE 3 is an exploded perspective view showing the utilization of my invention in conjunction with a commercially available multi-phase molded case circuit breaker unit, in series circuit coordinated operation with current limiting devices.

Figure 5:
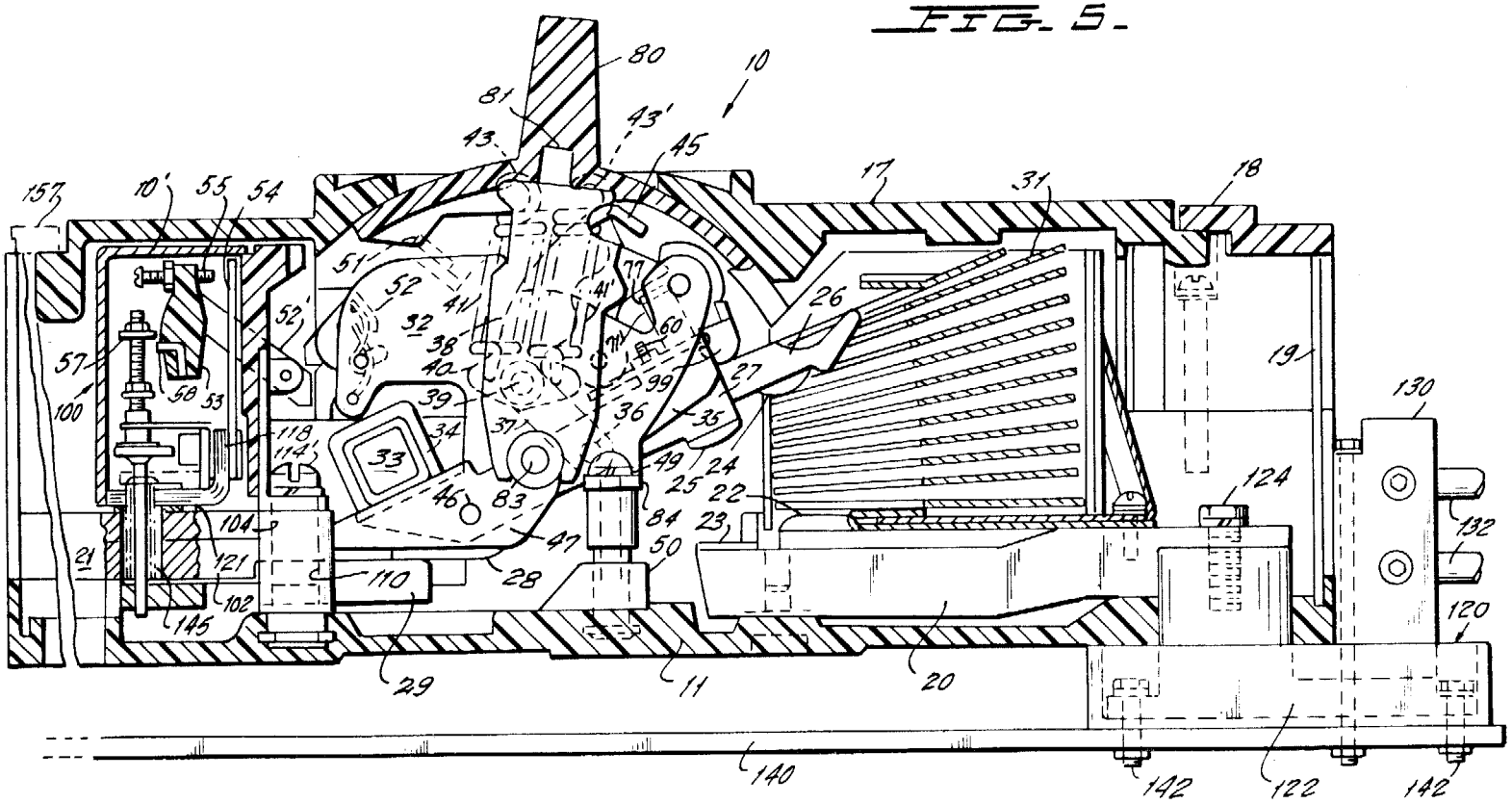
Figure 5A:
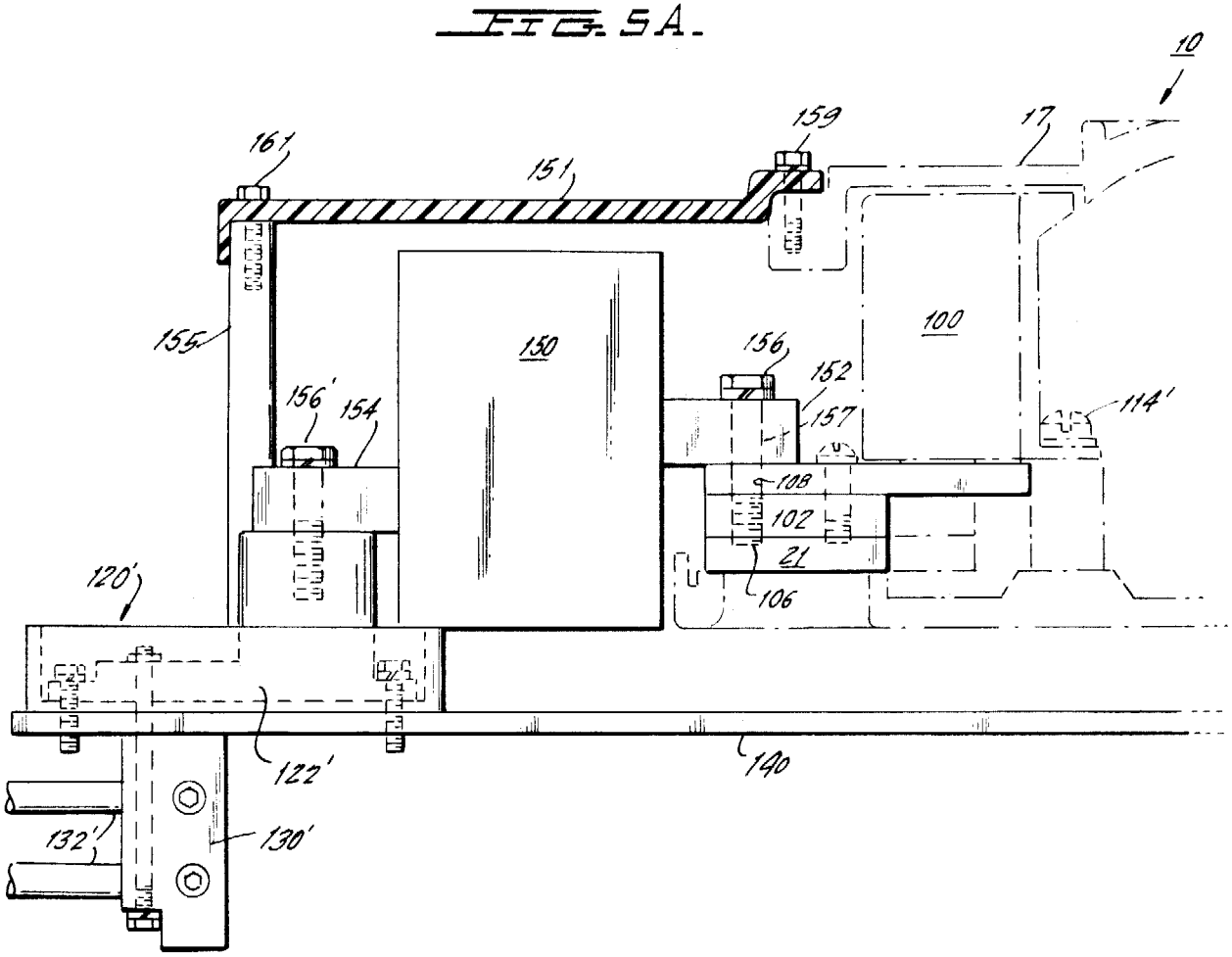
Figure 4:
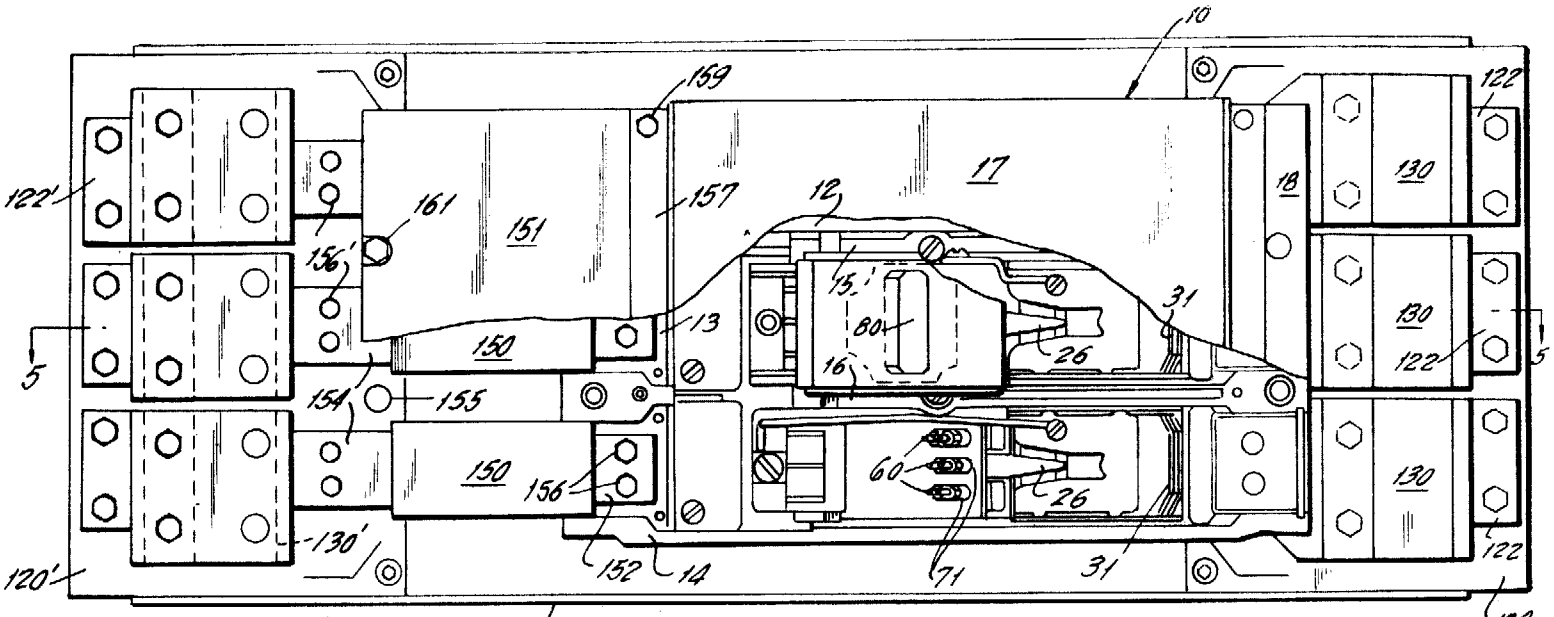
FIGURE 4 is a plan view of the circuit breaker device and current limiting fuse assembly, shown in FIG. 3, in the fully assembled position, but with the cover portion partially broken away to reveal the internal portions thereof.

FIGURES 5 and 5A collectively comprise a longitudinal cross-section view taken through the center-phase of the circuit breaker device and current limiting fuse assembly, along the line 5—5 as shown in FIG. 4, with the circuit breaker in the tripped open condition.

Figure 7:
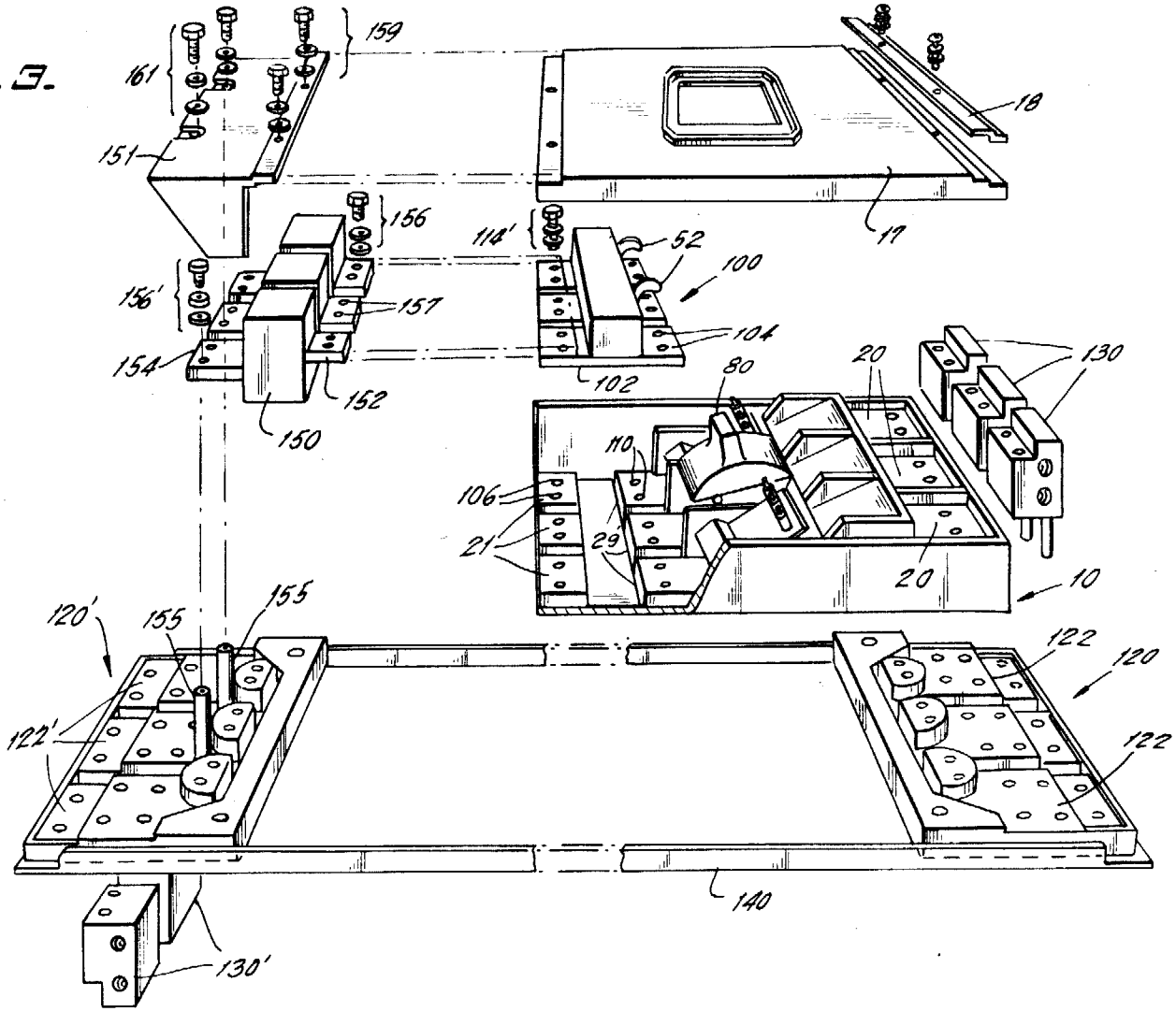
Figure 6:
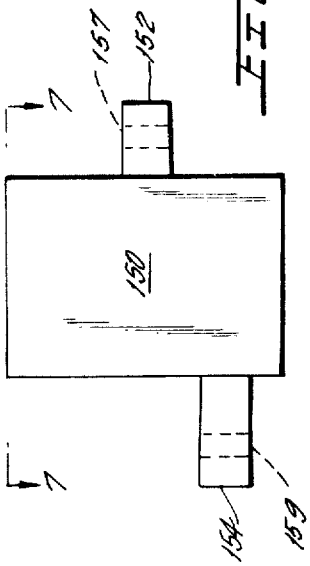
Figure 7:
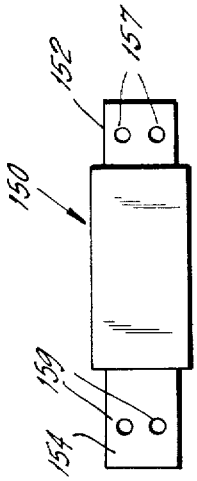

FIGURES 6 and 7 are side elevation and plan views respectively of the dual function current limiting device and heater means, constructed to accomplish the objects of the instant invention.

Referring now to FIG. 1, I show in generalized form a circuit breaker unit 10, located within housing 11 and having a cover 17. The circuit breaker 10 includes longitudinally displaced line and load terminads 20, 21, respectively. The connection from the circuit breaker line terminals 20 to the external circuit may be provided by numerous terminal circuit connection means well known in the art, as for example the mounting block assembly 120 which is the subject of copending U.S. patent application Ser. No. 503,185, filed Oct. 23, 1965, in the name of John C. Brumfield and entitled, "Circuit Breaker Mounting Arrangement"; in conjunction with individual phase conductor connecting means 130 which is the subject of copending U.S. patent application Ser. No. 503,320, filed Oct. 23, 1965, in the name of John R. Chamberlin, Jr., and entitled, "Reversible Connector Arrangement," both assigned to the assignee of the instant invention. Similarly, on the load side of the breaker assembly, the connections to the external circuit are made by a corresponding mounting block assembly 120' and individual phase conductor connecting means 130'.

The phase current through the circuit breaker includes a pair of cooperating stationary and movable contacts 23, 25, respectively. An operating mechanism 32, the details of which are not shown but will be described in conjunction with the ensuing discussion of FIGS. 4 and 5, is connected intermediate the movable contact arm 27, manual operating means 80, and thermally responsive bimetallic tip means 54 to effect disengagement of the contacts 23–25 responsive to either manual movement of the handle 80 or deflective movement of bimetallic member 54, in accordance with the time-delayed thermal tripping characteristic thereof, in the manner that is well known in the art. In addition, the circuit breaker unit 10 may also include an instantaneous or magnetically actuable trip means, which has been deleted from FIG. 1 for purposes of simplicity.

In accordance with the typical prior art arrangements, the heater means to indirectly heat the thermally responsive biametallic member 54 may typically be provided by a narrowed portion of the conducting strap 102 located at point D. Such a structure is, for example, shown in copending U.S. patent application Ser. No. 465,304, now U.S. Patent No. 3,305,653 issued Feb. 21, 1967, filed June 21, 1965, in the name of Albert Strobel entitled, "Circut Breaker Trip Assembly with Increased Compensation for Misalignment," and assigned to the assignee of the instant invention. Such a heater means will generate appreciable heat when subjected to currents within the normal rating of the circuit breaker unit, as for example a large frame size breaker designed to normally carry up to 1600 amps. at 600 volts. The generation of such heat within the circuit breaker unit corresponding to the occurrence of a normal load condition has in the past required a sufficient casing size to safely dissipate the heat. This requirement has been a limiting factor in permitting substantial compactness of such higher rated circuit breaker units.

In accordance with my invention, the trip means may be considered as including a first and a second subassembly. The first assembly includes the thermally responsive member 54, with the second sub-assembly including the thermally calibrated heater 150. More specifically, connected to the circuit breaker load terminal 21 and located external of the circuit breaker housing 11 and in a region providing free access to the surrounding atmosphere is a separate heater means 150 for indirectly heating the thermally responsive bimetallic member 54. Heater means 150 may typically be a current limiting device for electrically coordinating the tripping characteristics and interrupting capacity of the circuit breaker unit 10, with the available fault capacity of the circuit being protected. Heater means 150 need not, however, according to the broad aspects of my invention, be a current limiting device, with such dual functioning device being shown as a preferred embodiment. Heater means 150 includes terminal 152, connected to the circuit breaker load terminal 21 and trip unit strap 102 by bolt 156, and terminal 154 connected to the load end mounting block assembly 120', by bolt means 156'.

Heater means 150 may be selected to supply an adequate amount of heat for all ampere ratings of the circuit breaker 10 frame size. For each desired current rating a different conducting strap 102 is selected, having suitable thermal characteristics to correlate the heat generated by 150 to the characteristics of the bimetal 52 to effect the desired tripping protection. Alternatively, the bimetal may be changed, or the heater 150 may be changed, with the bimetal 52 and conducting strap 102 remaining unchanged. As to the latter arrangement, it is noted that the heater means 150 is positioned at a readily accessible location and may be easily removed and replaced and another heater means substituted therefor to alter the time-delayed tripping charactertstics of thermally responsive bimetallic member 54.

In accordance with the novel aspects of my invention, the heater means 150, when subjected to a moderate overload condition of the type which is intended to initiate actuation of thermally responsive trip means 54, has a thermal characteristic of temperature rise and heat dissipation to provide the operative relationship of heat flow shown graphically in FIG. 2. FIG. 2 represents the temperature at the various points A, B, C, D and E, shown in FIG. 1, under the following load conditions:

Curve 2–1 corresponds to 100% of rated load current after a time duration of five hours.

Curve 2–2 corresponds to 125% of rated load current after a time duration of one hour.

Curve 2–3 corresponds to 200% of maximum rated current after a time duration of fourteen minutes.

Curve 2–4 corresponds to 300% of maximum rated current after a time duration of two minutes.

Thus, curve 2–1 represents the maximum rated load condition of the circuit breaker, with curves 2–2, 2–3, and 2–4 representing various desired time-delayed tripping characteristics to be achieved by actuation of thermally responsive bimetallic member 54. Considering first the normal load condition of FIGURE 2–1, it is noted that point A corresponding to the line side connection to the external circuit will be at a relatively low temperature, with point B corresponding to the load side of the heater means at elevated temperature with respect thereto, and point C corresponding to the circuit breaker load terminal side of the heater means 150 being at a still appreciably higher temperature. The thermal characteristics of the heater means 150 is, however, operatively related to the thermal charactertstics of the thermally responsive member 54 and the thermally conductive path along strap 102, such that point C will preferably be at a slightly lower temperature than point D, at the base of the thermally responsive member 54, thereby inhibiting or substantially limiting the heat flow from heater means 150 into the circuit breaker housing 11 under conditions up to maximum rated current, with the heat generated within the heater being principally dissipated to the surrounding atmosphere. The temperature from point D of the circuit breaker to line side circuit connecting means 130 (point E) shows a gradual decrease, with the temperature at point E closely corresponding to the temperature at point A.

Reference is now made to FIGURES 2–2, 2–3 and 2–4, which progressively indicate the thermal characteristics at the heater means 150 and circuit breaker device 10, corresponding to increasingly greater magnitudes of overcurrent in the range intended to be interrupted by the actuation of thermally responsive means 54. Points B and C at the opposed ends of the heater means 150 indicate an increase in temperature and heating up thereof in a manner operatively related to the magnitude of such overload conditions, as indicated by the successively greater temperature rise with successively greater overcurrent conditions. The thermally responsive time-delayed tripping means 54 has a thermal characteristic, in conjunction with the thermal characteristic of the path along conducting strap 102, and operatively related to the thermal characteristic of the heater means 150, such that the temperature at point D will be lower than the temperature at point C corresponding to such predetermined overcurrent conditions. Thus, the heat flow will be from the heater means 150 to the thermally responsive means 54, as shown by the path of dotted arrows 160, with such heating serving to deflectively actuate thermally responsive means 54.

Reference is now made to FIGS. 3–5, which show the utilization of my inventive concept in the combination of a commercially available three-phase molded case circuit breaker device in conjunction with electrically coordinated current limiting fuse means. It should be naturally understood that the novel concepts of my invention may be incorporated in conjunction with numerous other circuit breaker devices and trip units therefor, of one or more phases, with this embodiment being merely for illustrative purposes.

Circuit breaker device 10 is assembled within a housing comprising a molded base 11 separated into individual phase compartments 12, 13 and 14 for locating the operating members of each of the phases. The adjacent compartments are separated by housing walls 15 and 16. The main cover assembly 17 similarly includes cooperating wall barriers for maintaining the longitudinally extending compartments of the housing. An end cover 18 is provided at the line side, with end shield 19 being located for increased electrical isolation. The external circuit connections to the individual circuit breaker line terminals 20 may typically be made by the provision of a mounting block assembly 120 of the type which is the subject of my aforementioned copending U.S. patent application Ser. No. 503,185. The mounting block assembly 120 includes individual conducting means 122, one for each of the phases, which are electrically connected to the individual line terminals 20 of the circuit breaker device, as by bolt means 124. The connections to the external circuit 132 may then be made by individual phase conducting means 130, of the type which are the subject of copending U.S. patent application Ser. No. 503,320. The mounting block assembly 120 is in turn rigidly secured to a frame support 140, as by bolt means 142. As the load end of the series connected circuit breaker device 10 and current limiting fuse means 150, the external circuit connections to 130' and 132' are similarly made by the provision of mounting block assembly 120', having individual conducting means 122', secured to terminals 154 of the heater means 150, as by bolt means 156'.

Considering now the details of the circuit breaker device 10, it is to be recognized that the current carrying members of all three phases are identical, so that for the sake of brevity only one of the circuit elements, such as the center phase as shown in FIG. 5, will be described The current path between the line terminal strap 20 and the load terminal strap 21 proceeds from stationary contacts 22, 23 to movable contacts 24 and 25, carried by contact arms 26 and 27 through flexible braids 28, common contact carrier strap 29, and the trip unit assembly strap 102. Since circuit breaker 10 is of a relatively high current carrying capacity (e.g., 1600 amps), contacts 22–24 function as arcing contacts and are properly situated to move into engagement and disengagement within the opening defined by circuit breaker arc chute assembly 31. The arcing contacts 22, 24 are shown paralleled by two sets of main contacts 23–25. The main movable contacts 25 are each mounted to individual contact arms 27, each connected by an individual section of braid 28, to contact carrier strap 29, while cooperating stationary contacts 23 are mounted to load terminal strap 20. The movable arcing contact 24 is similarly mounted to its contact arm 26, which is connected by a braid section 28, to the strap 29. Its cooperating stationary contact 22 is also mounted to line terminal strap 20. The contact arms 26, 27, 26 of each phase are in turn pivotally mounted by rod 36 to contact carrier 35.

An operating mechanism, generally shown as 32, is connected to contacts of all three phases by means of a transverse insulating tie bar 33, with U-shaped straps 34, connecting the respective carrier 35 to the common tie bar 33. Carrier 35 is pivotally mounted at 46 to suitable bearings in the operating mechanism frame 47. Mounting frame 47 includes ears 84, which receive bolt members 49 for securement to circuit breaker base embossment 50.

The center phase carrier 35 is connected at its pivot rod 36 to the lower of the operating mechanism toggle linkage 37–38, with the toggle links joined together at knee 39. Knee 39 also includes a pivotally mounted plate member 40, to which the circuit breaker operating springs, shown as a pair 41–41', are connected at one end 42–42' thereof. The other ends 43–43' are located in suitable apertures within the operating handle frame 45, such that the operating springs 41–41' are in overcenter relationship with respect to toggle linkage 37–38. the lower end of a handle frame member 45 is pivotally mounted to bosses 83 transversely extending outward of the operating mechanism frame 47. The externally projecting manual operating handle 80 is mounted to upstanding post 81 of the frame member 45.

The movable contact arm mounting may include individual adjusting studs 60 to establish the open gap circuit position of contacts 24–25, relative to stationary contacts 22–23, as well as contact pressure adjusting means shown as 71; as is the subject of my copending U.S. patent application Ser. No. 430,549, filed Feb. 5, 1965, now U.S. Patent No. 3,268,702 issued August 23, 1966, entitled, "Loosely Mounted Independent Coupling Means for Adjusting Contact Pressure and Contact Arm Position." Also, anti-rebound latch mechanism 99 may be provided to prevent rebound of the contact carrier 35 towards the stationary contacts 22, 23, as is the subject of copending U.S. patent application Ser. No. 494,313, filed Oct. 11, 1965, now U.S. Patent No. 2,299,244 issued Jan. 17, 1967, in the name of Albert Strobel and David T. Gray and entitled, "Anti-Rebound Latch." Automatic tripping of the circuit breaker operating mechanism 32 responsive to predetermined abnormal conditions is provided by the trip unit assembly, generally shown as 100, and which is the subject of copending U.S. patent application Ser. No. 465,313, filed June 21, 1965, in the name of Albert Strobel and John C. Brumfield, and entitled, "Circuit Breaker Trip Unit Assembly," all three of the above-noted patent applications being assigned to the assignee of the instant invention.

The operative connection between the circuit breaker trip unit assembly 100 and the operating mechanism 32 is provided by a cradle carried latch tip 51, for engagement with latching bracket extension 52 of the trip unit assembly 100. A coupling member generally shown as 52' interconnects latching bracket extension 52 to the tripper bar 53 of the trip unit assembly, so as to effect tripping disengagement of latch members 51, 52, upon counterclockwise movement of the trip bar 53, as shown in FIG. 5. Such counterclockwise movement is caused by either the actuation of the instantaneous magnetic trip, which will move extension 57 of the armature plunger 56 thereof downward into engagement with tripper bar extension 58; or deflective movement to the left of the time-delayed or thermally responsive bimetallic member 54 into engagement with calibration adjustment screw 55 carried by the tripper bar 53.

The trip unit assembly 100 is shown as an integral assembly contained within its own housing 101, and including a terminal strap 102 for connection to the current carrying members of each of the circuit breaker phases. Terminal strap 102 includes aperture 104, at one end thereof, to mate with cooperating aperture 110 of the circuit breaker contact carrier strap 29. The opposite end of terminal strap 102 includes aperture 108, which mates with cooperating aperture 106 of the circuit breaker line terminal, and 157 of the current limiting fuse terminal extension 152. Bolt means 114' extends through cooperating apertures 104, 110, and bolt means 156 extends through cooperating apertures 157, 108 and 106, for mounting each of the terminal straps 102 of the trip unit assembly 100 to their respective contact carrier straps 29 at one end thereof, and the load terminal 21 and current limiting fuse terminal 152 at the opposite end thereof. The opposite terminal 154 of the current limiting fuse 150 is connected by bolt means 156' to the individual phase conducting means 122' of the load side mounting block assembly 120'. For increased safety of operation, an insulative cover 151 preferably extends over the location of the current limiting fuse means 150 and is mounted to the circuit breaker cover 17 and posts 155 by bolt means 159, 161, respectively.

Consideration is now directed to the operation of the thermally responsive tripping means 54, located within the trip unit assembly 100. Member 54 is an elongated bimetallic element, mounted at its lower end, via flexible thermal shunt 118 to the top surface of trip unit strap member 102. Advantageously, a thermally conductive spacer plate 121 is interposed between the thermal shunt 118 and the connecting surface of the terminal strap 102, to permit substantially increased compensation for both lateral and vertical misalignment between the trip unit assembly and the circuit breaker frame, as is the subject of aforementioned U.S. Patent No. 3,305,653. As is well known in the art, the deflective movement to the left of the free end bimetallic element 54 is achieved in accordance with the duration and magnitude of heat flow presented thereto. The thermal characteristics of bimetallic member 54 and its source of heat are operatively interrelated to provide an inverse time characteristic within a predetermined overcurrent range, exceeding the maximum rated value of the circuit breaker mechanism. In the past the heat source means for such an indirectly heated bimetal 54 had been located within the housing 101 of the trip unit assembly 100, and typically comprised a significantly narrowed portion of the current conducting strap 102, immediately below the mounting of thermal shunt 118 and spacer plate 121 thereto. Similarly, in those circuit breaker devices which do not include a separate trip unit assembly, the heater of the thermally responsive time-delayed trip had also been located in the immediate vicinity of the bimetallic element and within the same molded case housing that encloses the cooperating contacts and operating means of the circuit breaker device. In contradistinction with the location of such appreciable sources of heat within the circuit breaker or trip unit housing, I provide an externally located calibrated heat source 150 for the thermally responsive member 54. That is, current limiting fuse member 150, which may be of the physical configuration shown in FIGS. 6 and 7, is constructed to provide the desired electrical interruption of current flow above the rated capacity of the circuit breaker, at least up to the available fault rating of the circuit being protected (e.g., 100,000 amperes), while having a calibrated thermal characteristic, as shown in FIGURE 2, to provide the appropriate heat source means for the deflective actuation of the thermally responsive bimetallic element 54, when subjected to an appreciably lower magnitude of overcurrent (e.g., in the order of 125 to 300 percent of the maximum rated value). The heat generated in current limiting fuse 150 is transmitted along a thermally conductive path including the fuse terminal 152, which is tightly bolted to trip unit strap 102 by bolt means 156, terminal strap 102, to its intermediate region, and then progressing through spacer plate 121 and thermal shunt 118 to the bimetallic element 54. It is to be noted that wherein previously trip unit strap 102 had to be of an appreciably decreased cross-section at the mounting of the thermal trip in order to provide an increased resistance heat source therefor, the trip unit terminal strap may now be of even an increased cross-section area to provide an efficient thermal conduction path and heat sink. If desired, an auxiliary heat source may be provided within the trip unit assembly, as by a somewhat reduced cross-sectional region of terminal strap 102 at the region wherein the time-delayed trip unit is mounted thereto. However, it should be understood, the principal, or at least a significant source of calibrated heat, will be derived from the current limiting fuse member 150, with such auxiliary heat source not being required to generate the appreciable amounts of heat typically required in the prior art devices.

It is therefore seen that my invention provides a novel arrangement for heating the thermally responsive trip unit of a circuit breaker device, and in accordance with a preferred embodiment thereof, utilizes the current limiting fuse means electrically coordinated with the circuit breaker device as the principal source of heat.

In the foregoing, the instant invention has been described in conjunction with a preferred embodiment. Since many variations will now become obvious to those skilled in the art, it is accordingly desired that the breadth of the claims not be limited to the specific disclosure herein contained but only by the appended claims.

The embodiments of the invention in which an exclusive privilege or property is claimed are defined as follows:

1. A circuit breaker device, comprising:

at least one pair of cooperating contacts, operating means connected to said contacts for moving said contacts between an engaged and disengaged condition, and a current responsive trip means operatively connected to said operating means for actuating said operating means and causing movement of said cooperating contacts to their disengaged condition responsive to an overload condition above a predetermined magnitude;

said trip means including a first and second sub-assembly, means interconnecting said sub-assemblies in a manner such that said second assembly is readily removable and replaceable with respect to said first sub-assembly while said first sub-assembly remains substantially intact;

said first sub-assembly including a thermally responsive means actuable by the duration and magnitude of heat flow presented thereto;

means for transmitting the actuation of said thermally responsive means to said operating means;

said second sub-assembly including a heater means, in the circuit path of current flow and characterized as increasing in temperature and generating heat in a manner operatively related to the magnitude of an overload condition;

said interconnecting means including a thermally conductive path between *the* thermally responsive means of said first sub-assembly and the heater means of said second sub-assembly, with said heater means and thermally responsive means being located at [longitudinally] spaced [,] first and second ends, respectively, of said thermally conductive path;

said heater means being located in a region providing free access to the surrounding atmosphere;

the thermal characteristics of said heater means and thermally responsive means operatively interrelated such that under conditions of normal load, up to said predetermined magnitude, the heat generated within said heater means is principally dissipated to the surrounding atmosphere and the heat flow to said thermally responsive means is minimized, and under conditions of moderate overload, above said predetermined magnitude, said first end of said path is at a higher temperature than said second end of said path whereby the direction of temperature differential between said path ends establishes a heat flow path from said heater means to said thermally responsive means and a substantial portion of the heat generated by said heater means is presented to said thermally responsive means.

2. A circuit breaker as set forth in claim 1, further including:

a housing means substantially enclosing said first subassembly, with said second assembly located external of said housing means.

3. In a molded case circuit breaker device, including a main housing containing:

at least one pair of cooperating contacts, operating means connected to said contacts, for moving said contacts between an engaged and disengaged condition, and a current responsive trip means operatively connected to said operating means for actuating said operating means and causing movement of said cooperating contacts to their disengaged condition above a predetermined magnitude responsive to an overload condition;

said trip means including a thermally responsive means actuable by the duration and magnitude of heat flow presented thereto;

means for transmitting the actuation of said thermally responsive means to said operating means;

the improvement comprising a heater means for said thermally responsive means in the circuit path of current flow and located external of said main housing in a region providing free access to the surrounding atmosphere;

said heater means characterized as increasing in temperature and generating heat in a manner operatively related to the magnitude of an overload condition;

a thermally conductive path between said thermally responsive means and heater means to provide an operative connection therebetween, with said heater means and thermally responsive means being located at [longitudinally] spaced first and second ends, respectively, of said thermally conductive path;

the thermal characteristics of said heater means and thermally responsive means operatively interrelated such that under conditions of normal load, up to said predetermined magnitude, the heat generated within said heater means is principally dissipated to the surrounding atmosphere and the heat flow to said thermally responsive means is minimized, and under conditions of moderate overload, above said predetermined magnitude said first end of said path is at a higher temperature than said second end of said path when said heater means is subjected to an overload condition, whereby the direction of temperature differential between said path ends establishes a heat flow path from said heater means external of said main housing to said thermally responsive means, within said main housing, and a substantial portion of heat generated by said heater means is presented to said thermally responsive means.

4. A multiphase molded case circuit breaker device, including a main housing comprising:

at least one pair of cooperating contacts for each phase, an operating means connected to said contacts for moving said contacts between an engaged and disengaged condition, latch means cooperating with said operating means for maintaining said contacts in their engaged condition under normal load conditions, a trip means including an integral trip means assembly having spaced terminals connected to cooperating spaced terminals within the circuit breaker housing, said trip means assembly including a thermally responsive means for each phase actuable by the duration and magnitude of heat flow presented thereto, and including means for releasing said latch means responsive to actuation of at least one of said thermally responsive means, said trip means further including an individual heater means for each of said thermally responsive means, in the circuit path of the respective phase current flow, said heater means characterized as increasing in temperature and generating heat in a manner operatively related to the magnitude of an overload condition, said heater means located external of said trip means assembly, in a region providing free access to the surrounding atmosphere, said heater means including spaced terminals, one of which is connected to an adjacent terminal of said trip means assembly and the other of which is provided for connection to an external circuit to be protected, a thermally conductive path between said thermally responsive means and heater means, and passing through the common terminal connection thereof, with said heater means and thermally responsive means being located at [longitudinally] spaced first and second ends, respectively, of said thermally conductive path, the thermal characteristics of said heater means and thermally responsive means operatively interrelated such that under conditions of normal load the heat generated within said heater means is principally dissipated to the surrounding atmosphere and the heat flow to said thermally responsive means is minimized, and under conditions of moderate overload said first end of said path is at a higher temperature than said second end of said path when said heater means is subjected to an overload condition whereby the direction of temperature differential between said path ends establishes a heat flow path from said heater means to said thermally responsive means, and a substantial portion of the heat generated by said heater means is presented to said thermally responsive means.

5. In combination, a circuit breaker device and a separate current limiting fuse, circuit connected together for coordinated interruption of abnormal current flow, said circuit breaker device having an interrupting capacity less than the available abnormal current capacity of the circuit being protected, said circuit breaker device including at least one pair of cooperating contracts, operating means connected to said contacts for moving said contacts between an engaged and disengaged condition, and a current responsive trip means operatively connected to said operating means for actuating said operating means and causing movement of said cooperating contacts to their disengaged condition responsive to an overload condition, within the interrupting capacity of the circuit breaker, a molded case housing for said circuit breaker device, including said cooperating contacts, current responsive trip means and operating means, said current limiting fuse located external to said molded case housing, said current limiting fuse having an electrical characteristic such that it interrupts only abnormal currents of values in excess of the interrupting capacity of said circuit breaker, at least up to the available abnormal current of the circuit being protected, said trip means including a thermally responsive means actuable by the duration and magnitude of heat flow presented thereto, means for transmitting the actuation of said thermally responsive means to said operating means, said current limiting fuse having a thermal characteristic such that it increases in temperature and generates heat when subjected to overload current within the range of interrupting capacity of the circuit breaker which is intended to be interrupted by the actuation of said thermally responsive means, with such generated heat being operatively related to the magnitude of such overload condition, a thermally conductive path between said thermally responsive means and current limiting fuse, with said current limiting fuse and thermally responsive means located at [longitudinally] spaced first and second ends, respectively, of said thermally conductive path, the thermal characteristics of said current limiting fuse and thermally responsive means operatively interrelated such that said first end of said path is at a higher temperature than said second end of said path when said current limiting fuse is subjected to an overload condition within the range intended to be interrupted by said thermally responsive means, whereby the direction of temperature differential between said path ends establishes a heat flow path from said current limiting fuse to said thermally responsive means, and said current limiting fuse serves as the principal heat source for actuation of said thermally responsive means.

6. In combination, a circuit breaker device and current limiting fuse means circuit connected together for coordinated interruption of abnormal current flow within a multi-phase circuit to be protected, said circuit breaker device having a plurality of individual phase current paths, one for each phase of the circuit to be protected, and having an interrupting capacity less than the available abnormal phase current capacity, said circuit breaker including at least one pair of cooperating contacts for each phase current path, an operating means connected to said contacts for moving said contacts between an engaged and disengaged condition, latch means cooperating with said operating means for maintaining said contacts in their engaged condition under normal load conditions, a trip means including a thermally responsive means for each phase actuable by the duration and magnitude of heat flow presented thereto, and including means for releasing said latch means responsive to actuation of at least one of said thermally responsive means, said current limiting fuse means mounted to said circuit breaker device independent of said trip means, and including a separate fuse for each of the phase current paths through the circuit breaker and in series circuit relationship therewith, said current limiting fuse means being located in a region providing free access to the surrounding atmosphere, said current limiting fuse having a thermal characteristic such that it increases in temperature and generates heat when subjected to overload current within the range of interrupting capacity of the circuit breaker which is intended to be interrupted by the actuation of said thermally responsive means, with such generated heat being operatively related to the magnitude of such overload condition, a thermally conductive path between said thermally responsive means and current limiting fuse, with said current limiting fuse and thermally responsive means located at [longitudinally] spaced first and second ends, respectively, of said thermally conducting path, the thermal characteristics of said current limiting fuse and thermally responsive means operatively interrelated such that under conditions of normal load, the heat generated within said current limiting fuse is principally dissipated to the surrounding atmosphere and the heat flow to said thermally responsive means is minimized, and under conditions of moderate overload, said first end of said path is at a higher temperature than said second end of said path when said current limiting fuse is subjected to an overload condition within the range intended to be interrupted by said thermally responsive means, whereby the direction of temperature differential between said path ends establishes a heat flow path from said current limiting fuse to said thermally responsive means, and said current limiting fuse serves as the principal heat source for actuation of said thermally responsive means.

7. In combination, a multiphase molded case circuit breaker device and a current limiting device in each of the individual phase current paths thereof;

said circuit breaker including at least one pair of cooperating contacts for each phase and an operating means for simultaneously operating said pairs of contacts between an engaged and disengaged condition;

each of said phases also including a thermally actuated time delay and magnetic trip means;

said current limiting devices located external of the circuit breaker molded case, and in electrical series with their respective phase current paths through the circuit breaker device;

said time delay trip means effective to initiate opening operation of all pairs of said cooperating contacts on the occurrence of an over-current below a first predetermined magnitude; said magnetic trip means effective to initiate opening operation of all pairs of said cooperating contacts on the occurrence of a fault current above said first predetermined current magnitude and below a second predetermined current magnitude; said current limiting device effective to interrupt short-circuit currents above said second predetermined magnitude, and at least up to the available current capacity of the circuit being protected;

said current limiting device having a thermal characteristic such that it increases in temperature and generates heat when subjected to an over-current within the range up to said first predetermined magnitude, with such generated heat being operatively related to the magnitude of such over-current condition;

said current limiting devices being located in a region providing free access to the surrounding atmosphere;

a thermally conductive path between said current limiting device and said time delay trip means;

the thermal characteristics of said current limiting device and time delay trip means operatively interrelated, such that under conditions of normal load, the heat generated within said current limiting device is principally dissipated to the surrounding atmosphere and the heat flow to said thermally responsive means is minimized, and under conditions of moderate overload within the over-current range up to said first predetermined magnitude the heat generated within said current limiting device is thermally conducted along said path to said time delay trip means, and said current limiting device serves as a significant heat source for the actuation of said time delay trip means.

8. In the combination as set forth in claim 6:

a molded case housing for said circuit breaker device, including said cooperating contacts, operating means and trip means;

said trip means being an integral assembly including spaced terminals for connection to cooperating spaced terminals within the circuit breaker housing;

each of said current limiting fuses including spaced terminals, one of which is connected to an adjacent externally accessible terminal of said trip means assembly, and the other of which is provided for external connection to the respective phase circuit to be protected, such that all of the terminal connections to said current limiting fuse means are made external to said molded case circuit breaker housing.

9. In combination with a circuit breaker comprising:

at least one pair of cooperating contacts and operating means for moving said contacts between an engaged and disengaged condition;

a current responsive trip means within said circuit breaker and operatively connected to said operating means for initiating disengagement of said contacts responsive to an overload condition up to a predetermined magnitude, below the available fault capacity of the circuit being protected;

and a current limiting means external to said circuit breaker and circuit connected to said trip means and cooperating contacts for preventing the magnitude of current therethrough from reaching said available fault current capacity;

said trip means including a thermally responsive means actuable by the heat flow presented thereto;

said current limiting means characterized as generating heat operatively related to the current flow therethrough when subjected to an overload condition within the range up to said predetermined magnitude;

said current limiting means being located in a region providing free access to the surrounding atmosphere;

a thermally conductive path between said current limiting means and said thermally responsive trip means;

the thermal characteristics of said current limiting means and thermally responsive trip means operatively interrelated such that under conditions of normal load, the heat generated within said current limiting means is principally dissipated to the surrounding atmosphere and the heat flow to said thermally responsive means is minimized, and under conditions of moderate overload within the overload range up to said predetermined magnitude the heat generated within said current limiting means is thermally conducted along said path to said thermally responsive trip means, and said current limiting means serves as the principal heat source for the actuation of said thermally responsive trip means.

10. In combination, a circuit breaker device and a current limiting fuse circuit connected together for coordinated interruption of abnormal current flow, said circuit breaker device having an interrupting capacity less than the available abnormal current capacity of the circuit being protected, said circuit breaker device including at least one pair of cooperating contacts, operating means connected to said contacts for moving said contacts between an engaged and disengaged condition, and a current responsive trip means operatively connected to said operating means for causing movement of said cooperating contacts to their disengaged condition responsive to an overload condition, within the interrupting capacity of the circuit breaker, said current limiting fuse having an electrical characteristic such that it interrupts only abnormal currents of values in excess of the interrupting capacity of said circuit breaker, at least up to the available abnormal current of the circuit being protected, said current limiting fuse having a thermal characteristic such that it increases in temperature and generates heat when subjected to overload current within a range of interrupting capacity which is intended to be interrupted by the actuation of the circuit breaker, with such generated heat being operatively related to the magnitude of such overload condition, said trip means including overload responsive means to interrupt sustained overload currents in accordance with a predetermined time-duration characteristic, said overload responsive means including thermally responsive means actuable by the duration and magnitude of heat flow presented thereto, and a thermally conductive path between said thermally responsive means and current limiting fuse, a thermally conductive path between said current limiting fuse and thermally responsive means, with said current limiting fuse and thermally responsive means located at [longitudinally] spaced first and second ends, respectively, of said thermally conductive path, said current limiting fuse being located in a region providing free access to the surrounding atmosphere, said trip means including provision for the selective reception of either a first or second overload responsive means, said first overload responsive means having a first predetermined time-duration characteristic of actuation, and said second overload responsive means having a second predetermined time-duration characteristic of actuation, said second characteristic differing from said first characteristic, the thermal characteristics of said current limiting fuse operatively inter-related to the selected one of said overload responsive means, such that under conditions of normal load, the heat generated within said current limiting fuse is principally dissipated to the surrounding atmosphere and the heat flow to said thermally responsive means is minimized, and under conditions of moderate overload, said first end of said path is at a higher temperature than said second end of said path when said current limiting fuse is subjected to an overload condition within the range intended to be interrupted by said overload responsive means, whereby the direction of temperature differential between said path ends establishes a heat flow path from said current limiting fuse via said thermally conductive path to said thermally responsive means, said current limiting fuse serves as the principal heat source for actuation of the selected one of said thermally responsive means.

References Cited

The following references, cited by the Examiner, are of record in the patented file of this patent or the original patent.

UNITED STATES PATENTS

| | | | |
|---|---|---|---|
| 1,681,851 | 8/1928 | Getchell | 200—122 |
| 2,175,859 | 10/1939 | Tusing | 200—116 |
| 2,317,830 | 4/1943 | Vaughan | 200—122 |
| 2,422,508 | 6/1947 | Von Hoorn | 200—114 |
| 2,911,502 | 11/1959 | Edsall | 200—116 |
| 2,982,834 | 5/1961 | Edmunds | 200—116 |
| 3,032,629 | 5/1962 | Wecker | 200—116 |
| 3,043,934 | 7/1962 | Bodenschatz | 200—116 |
| 3,139,497 | 6/1964 | Giessner | 200—116 |

BERNARD A. GILHEANY, *Primary Examiner.*

H. B. GILSON, *Assistant Examiner.*